United States Patent
Chang et al.

(10) Patent No.: US 12,409,645 B2
(45) Date of Patent: Sep. 9, 2025

(54) LAMINATION APPARATUS AND LAMINATION METHOD

(71) Applicant: AUO Corporation, Hsinchu (TW)

(72) Inventors: Yu-Lun Chang, Hsinchu (TW); Kuan-Hsun Chen, Hsinchu (TW)

(73) Assignee: AUO Corporation, Hsinchu (TW)

( * ) Notice: Subject to any disclaimer, the term of this patent is extended or adjusted under 35 U.S.C. 154(b) by 149 days.

(21) Appl. No.: 18/522,275

(22) Filed: Nov. 29, 2023

(65) Prior Publication Data

US 2025/0001751 A1 Jan. 2, 2025

(30) Foreign Application Priority Data

Jun. 30, 2023 (TW) .................................. 112124442

(51) Int. Cl.
*B32B 38/00* (2006.01)
*B32B 37/00* (2006.01)

(52) U.S. Cl.
CPC ...... *B32B 38/0004* (2013.01); *B32B 37/0046* (2013.01)

(58) Field of Classification Search
CPC . B32B 38/0004; B32B 37/0046; B32B 37/10; H10K 50/844; H10K 59/873; H10K 71/00; H10H 20/01; H10H 20/852
See application file for complete search history.

(56) References Cited

U.S. PATENT DOCUMENTS

| | | | | |
|---|---|---|---|---|
| 7,621,307 | B2 * | 11/2009 | Saito | ............ H01L 21/6836 156/154 |
| 10,872,791 | B2 * | 12/2020 | Sekiya | ............ H01L 21/67132 |
| 2011/0041989 | A1 * | 2/2011 | Anspach | ............ E04F 15/10 264/163 |

FOREIGN PATENT DOCUMENTS

| | | |
|---|---|---|
| CN | 210272405 | 4/2020 |
| CN | 111634467 | 9/2020 |
| CN | 211919092 | 11/2020 |
| CN | 213891676 | 8/2021 |

* cited by examiner

*Primary Examiner* — George R Koch
*Assistant Examiner* — Christopher C Caillouet
(74) *Attorney, Agent, or Firm* — JCIPRNET (57) ABSTRACT

A lamination apparatus is adapted to laminate an encapsulation glue and a panel. The lamination apparatus includes a lower mold, an upper mold, and a cutting knife. The lower mold has a lamination area and a peripheral area adjacent to the lamination area. The panel is adapted to be retained in the lamination area. The upper mold is movable close to or away from the lower mold, and includes an encapsulation glue fixing part. The encapsulation glue fixing part is adapted to fix the encapsulation glue to the upper mold. The cutting knife is disposed in the peripheral area of the lower mold, and is located in a horizontal direction between the lamination area of the lower mold and the encapsulation glue fixing part of the upper mold. In addition, a lamination method is also disclosed.

12 Claims, 5 Drawing Sheets

LAMINATION APPARATUS AND LAMINATION METHOD

CROSS-REFERENCE TO RELATED APPLICATION

This application claims the priority benefit of Taiwan application serial no. 112124442, filed on Jun. 30, 2023. The entirety of the above-mentioned patent application is hereby incorporated by reference herein and made a part of this specification.

BACKGROUND

Technical Field

This disclosure relates to a lamination apparatus and a lamination method.

Description of Related Art

In order to protect the panel and enhance the reliability of the panel, a lamination machine is used to laminate the panel with an encapsulation glue layer. Generally, the area of the encapsulation glue layer in the lamination machine table extends beyond the perimeter of the panel. Therefore, after the panel and the encapsulation glue layer are laminated, the peripheral area of the encapsulation glue layer will overhang from the panel and will need to be cut by another cutting machine. However, using another cutting machine to cut the peripheral area of the encapsulation glue layer will increase the overall process time. In addition, the panel may be damaged during the process of cutting the encapsulation glue layer with the cutting machine.

SUMMARY

This disclosure provides a lamination apparatus, capable of reducing process time.

The disclosure provides a lamination method, capable of simplifying process steps.

The lamination apparatus of the disclosure is adapted to laminate an encapsulation glue and a panel. The lamination apparatus includes a lower mold, an upper mold, and a cutting knife. The lower mold has a lamination area and a peripheral area adjacent to the lamination area. The panel is adapted to be retained in the lamination area. The upper mold is movable close to or away from the lower mold, and includes an encapsulation glue fixing part. The encapsulation glue fixing part is adapted to fix the encapsulation glue to the upper mold. The cutting knife is disposed in the peripheral area of the lower mold, and is located in a horizontal direction between the lamination area of the lower mold and the encapsulation glue fixing part of the upper mold.

In an embodiment of the disclosure, the lamination area of the lower mold includes a groove, and the panel is adapted to be retained in the groove.

In an embodiment of the disclosure, the lamination apparatus further includes at least one buffer member disposed on a lower surface of the upper mold facing the lower mold corresponding to the lamination area of the lower mold. The panel disposed in the lamination area and the cutting knife are located in an orthographic projection of the at least one buffer member on the lower mold.

In an embodiment of the disclosure, the lamination apparatus further includes at least one buffer member disposed on a lower surface of the upper mold facing the lower mold corresponding to the lamination area of the lower mold. The at least one buffer member protrudes from the lower surface of the upper mold and has a lower surface facing the lower mold, the lower surface of the at least one buffer member has a vertical distance from the lower surface of the upper mold in a vertical direction, the at least one buffer member has a horizontal distance from the encapsulation glue fixing part in the horizontal direction, and a ratio of the vertical distance to the horizontal distance falls in a range of 0.05 to 0.15.

In an embodiment of the disclosure, the lamination apparatus further includes at least one buffer member disposed on a lower surface of the upper mold facing the lower mold corresponding to the lamination area of the lower mold. When the upper mold and the lower mold laminate the encapsulation glue and the panel, a sum of a height of the cutting knife and a thickness of at least a portion of the at least one buffer member protruding from the lower surface of the upper mold is greater than or equal to a vertical distance from the upper mold to the peripheral area of the lower mold.

In an embodiment of the disclosure, the lamination apparatus further includes a pressing buffer member and a cutting buffer member disposed in the upper mold. The cutting buffer member is located between the pressing buffer member and the encapsulation glue fixing part in the horizontal direction.

In an embodiment of the disclosure, the panel disposed in the lamination area of the lower mold is located in an orthographic projection of the pressing buffer member on the lower mold, and the cutting knife is located in an orthographic projection of the cutting buffer member on the lower mold.

In an embodiment of the disclosure, the upper mold has a lower surface facing the lower mold, the pressing buffer member has a lower surface facing the lower mold, the cutting buffer member has a lower surface facing the lower mold, the pressing buffer member and the cutting buffer member protrude from the lower surface of the upper mold, and a vertical distance between the lower surface of the pressing buffer member and the lower surface of the upper mold is greater than or equal to a vertical distance between the lower surface of the cutting buffer member and the lower surface of the upper mold.

In an embodiment of the disclosure, when the upper mold and the lower mold laminate the encapsulation glue and the panel, a sum of a height of the cutting knife and a height of the cutting buffer member is greater than or equal to a vertical distance from the upper mold to the peripheral area of the lower mold.

In an embodiment of the disclosure, the upper mold has an accommodation groove, and the cutting buffer member is disposed in the accommodation groove.

The lamination method of the disclosure is adapted to laminate an encapsulation glue and a panel. The lamination method includes the following. The panel is retained in a lamination area of a lower mold. The encapsulation glue is fixed to the upper mold using an encapsulation glue fixing part of an upper mold. The upper mold is moved close to the lower mold to laminate the encapsulation glue and the panel. The encapsulation glue is cut into a cutting part and a laminating part connected to the panel using a cutting knife disposed in the lower mold and located in a horizontal direction between the lamination area of the lower mold and the encapsulation glue fixing part of the upper mold. The upper mold is moved away from the lower mold. The upper mold fixes the cutting part of the encapsulation glue to the upper mold through the encapsulation glue fixing part, and the cutting part of the encapsulation glue is driven by the upper mold away from the laminating part of the encapsulation glue.

In an embodiment of the disclosure, when the encapsulation glue and the panel are laminated, the cutting knife simultaneously cuts the encapsulation glue into the cutting part and the laminating part.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Reference will now be made in detail to the exemplary embodiments of the disclosure, examples of which are illustrated in the accompanying drawings. Whenever possible, the same reference numbers are used in the drawings and descriptions to refer to the same or similar parts.

It should be understood that when an element such as a layer, film, region, or substrate is referred to as being "on" or "connected to" another element, it can be directly on or connected to another element, or intermediate elements may also be present. In contrast, when an element is referred to as being "directly on" or "directly connected to" another element, there are no intermediate elements present. As used herein, "connected" may refer to a physical and/or electrical connection. Furthermore, "electrical connection" or "coupling" may refer to the presence of other elements between two elements.

As used herein, "about," "approximately," or "substantially" includes the stated value and the average within an acceptable range of deviations from the particular value as determined by a person having ordinary skill in the art, considering the measurements in question and a specific amount of error associated with a measurement (i.e., the limitations of the measurement system). For example, "about" may mean within one or more standard deviations of the stated value, or within ±30%, ±20%, ±10%, ±5%. Furthermore, the terms "about", "approximately" or "substantially" used herein may be used to select a more acceptable deviation range or standard deviation based on optical properties, etching properties, or other properties, and one standard deviation may not apply to all properties.

Unless otherwise defined, all terms (including technical and scientific terms) used herein have the same meaning as commonly understood by a person having ordinary skill in the art. It should be further understood that terms such as those defined in commonly used dictionaries should be construed to have meanings consistent with their meanings in the context of the relevant technology and the disclosure, and are not to be construed as idealistic or excessive formal meaning, unless explicitly so defined herein.

Figure 1A:
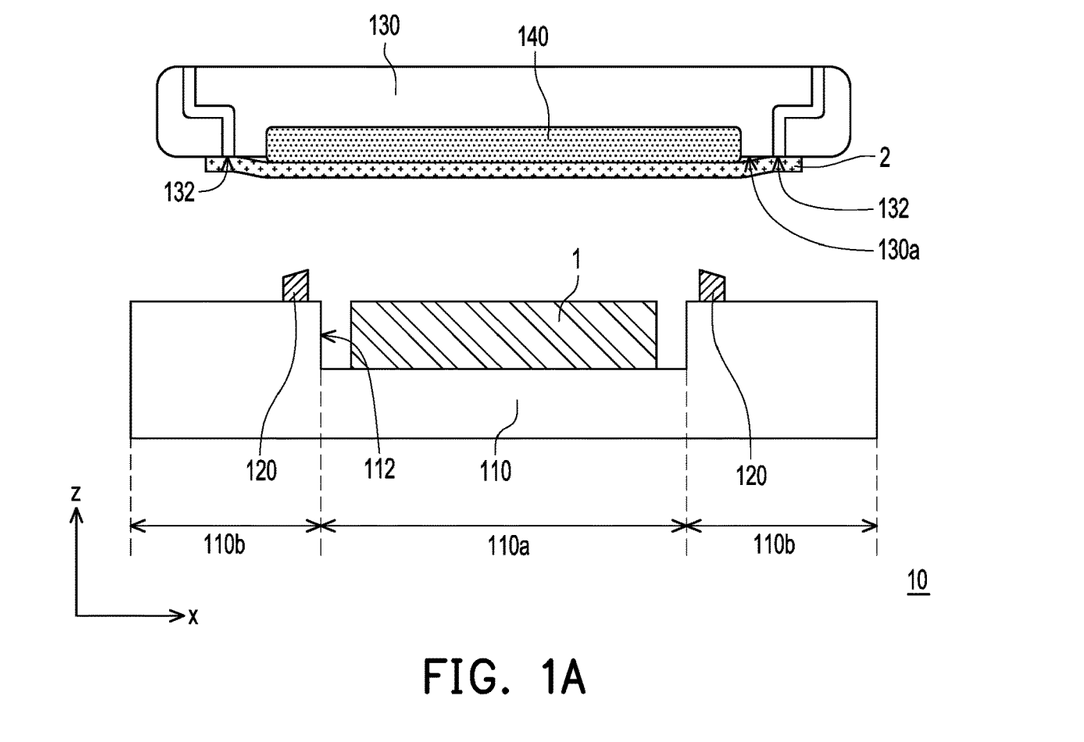
FIG. 1A to FIG. 1C are schematic cross-sectional views of a process of a lamination method according to an embodiment of the disclosure.
Figure 1B:
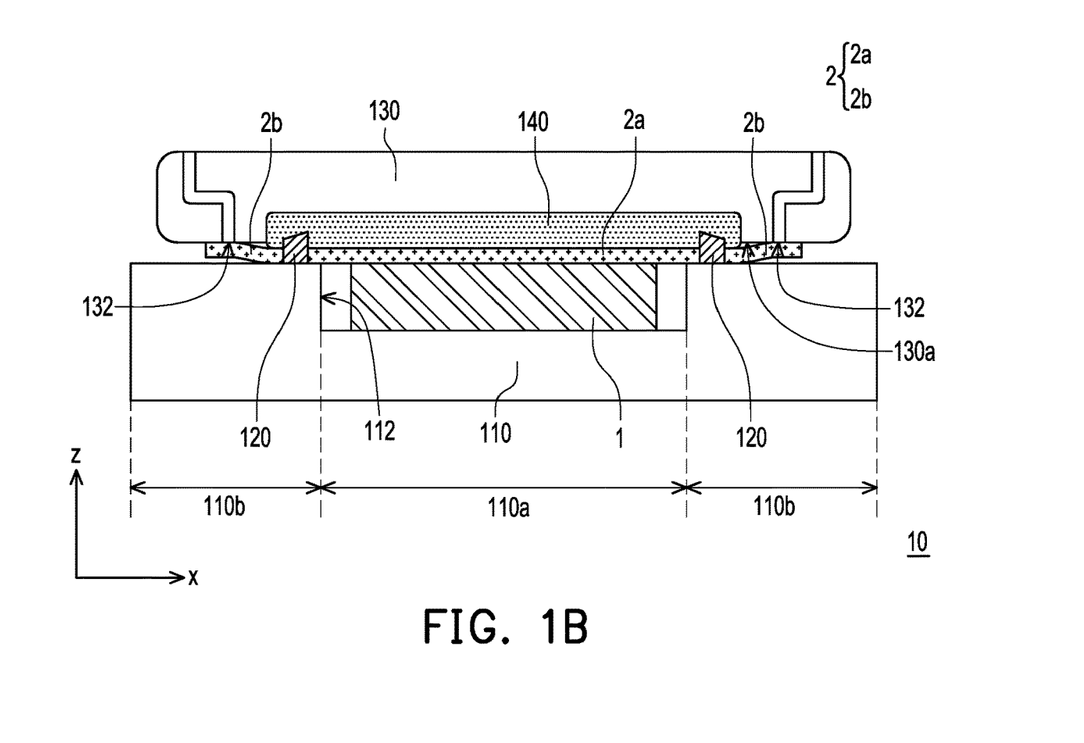
Figure 1C:
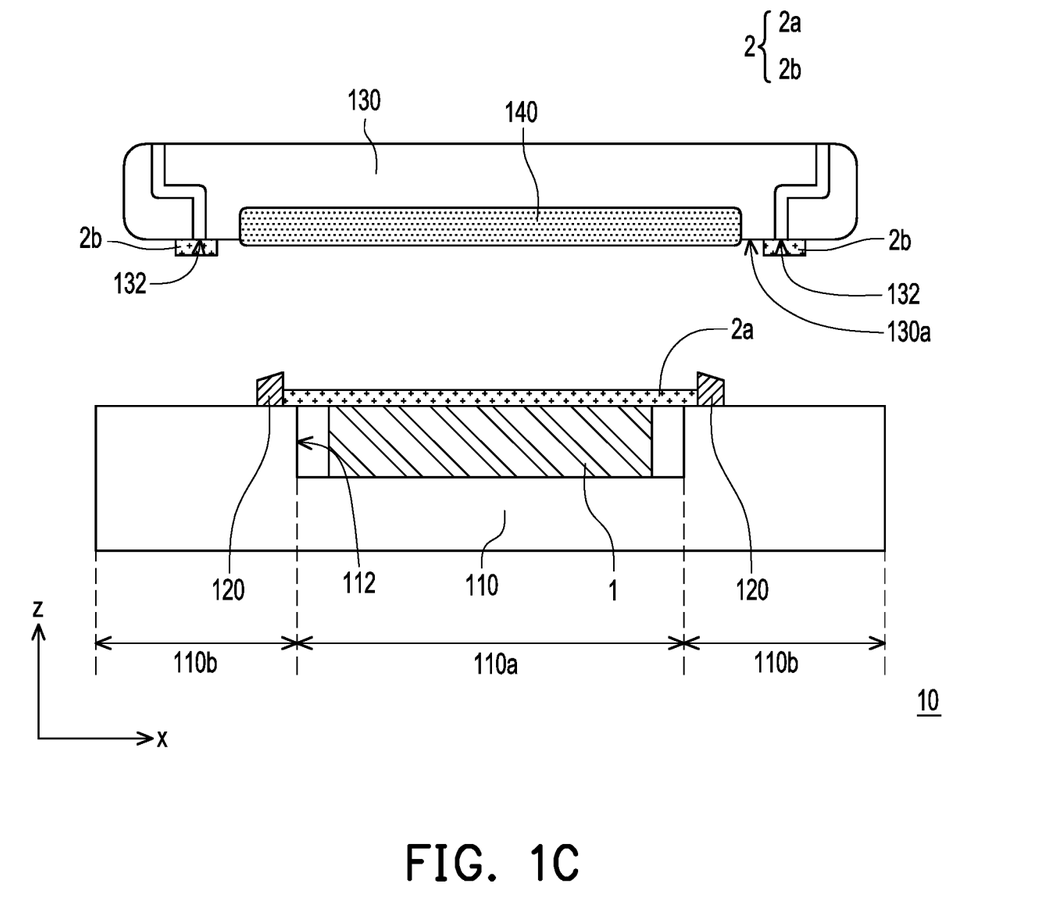

FIG. 1A to FIG. 1C are schematic cross-sectional views of a process of a lamination method according to an embodiment of the disclosure. The lamination method shown in FIG. 1A to FIG. 1C is to laminate an encapsulation glue 2 and a panel 1 using a lamination apparatus 10. In an embodiment, the panel 1 is, for example, a light-emitting element array substrate. The light-emitting element substrate includes a base (not shown), a driving circuit layer (not shown) disposed on the base, and multiple light-emitting elements (not shown) electrically connected to the driving circuit layer. In an embodiment, the light-emitting element is, for example, a micro light-emitting diode element or an organic light-emitting diode element, but the disclosure is not limited thereto. In an embodiment, the encapsulation glue 2 may include a release film, but the disclosure is not limited thereto.

Referring to FIG. 1A, the lamination apparatus 10 is adapted to laminate the encapsulation glue 2 and the panel 1. The lamination apparatus 10 includes a lower mold 110. The lower mold 110 has a lamination area 110a and a peripheral area 110b adjacent to the lamination area 110a. The panel 1 is adapted to be retained in the lamination area 110a of the lower mold 110. For example, in an embodiment, the lamination area 110a of the lower mold 110 may include a groove 112, and the panel 1 is adapted to be retained in the groove 112. The peripheral area 110b may include a frame-shaped platform defining the groove 112, but the disclosure is not limited thereto.

The lamination apparatus 10 further includes an upper mold 130. The upper mold 130 is movable close to or away from the lower mold 110 and includes an encapsulation glue fixing part 132. The encapsulation glue fixing part 132 is adapted to fix the encapsulation glue 2 to the upper mold 130. For example, in an embodiment, the encapsulation glue fixing part 132 may include a vacuum pipe, through which the upper mold 130 may hold the encapsulation glue 2. However, the disclosure is not limited thereto. In other embodiments, the encapsulation glue fixing part 132 can also be in other forms.

The lamination apparatus 10 further includes a cutting knife 120 disposed in the peripheral area 110b of the lower mold 110 and is located in a horizontal direction x between the lamination area 110a of the lower mold 110 and the encapsulation glue fixing part 132 of the upper mold 130. For example, in an embodiment, an orthographic projection of the cutting knife 120 on the lower mold 110 may surround the lamination area 110a, but the disclosure is not limited thereto.

In an embodiment, the lamination apparatus 10 may optionally further include at least one buffer member 140. The at least one buffer member 140 is disposed on a lower surface 130a of the upper mold 130 facing the lower mold 110 corresponding to the lamination area 110a of the lower mold 110. In an embodiment, the panel 1 disposed in the lamination area 110a and the cutting knife 120 may be located in an orthographic projection of the at least one buffer member 140 on the lower mold 110. However, the disclosure is not limited thereto. In another embodiment not shown, the panel 1 may be located in the orthographic projection of the at least one buffer member 140 on the lower mold 110, and the cutting knife 120 may be located outside the orthographic projection of the at least one buffer member 140 on the lower mold 110.

In an embodiment, the at least one buffer member 140 covering the lamination area 110a of the lower mold 110 and the cutting knife 120 may optionally be a complete piece of buffer material. However, the disclosure is not limited thereto. In other embodiments, the at least one buffer member 140 may also include multiple pieces of buffer material that are separated from each other. In an embodiment, the encapsulation glue fixing part 132 (e.g., a vacuum suction head) may be located on opposite sides of the at least one buffer member 140 without necessarily surrounding the at least one buffer member 140, but the disclosure is not limited thereto.

Figure 2A:
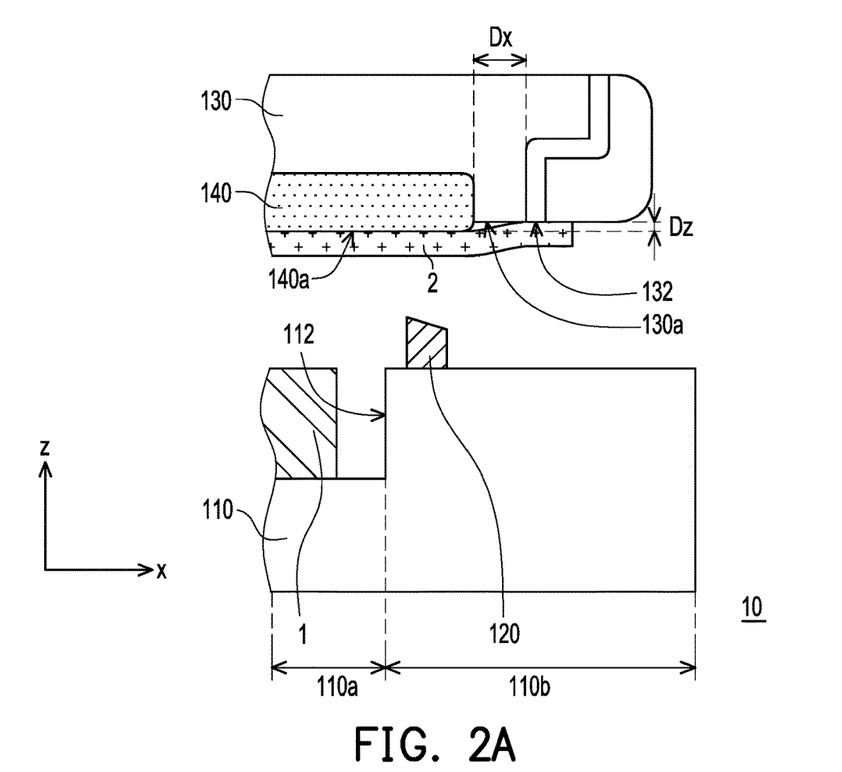
FIG. 2A is a partially enlarged schematic view of a lamination apparatus of FIG. 1A.

FIG. 2A is a partially enlarged schematic view of a lamination apparatus of FIG. 1A. Referring to FIG. 2A, in an embodiment, the at least one buffer member 140 protrudes from the lower surface 130a of the upper mold 130 and has a lower surface 140a facing the lower mold 110. The lower surface 140a of the at least one buffer member 140 has a vertical distance Dz from the lower surface 130a of the upper mold 130 in a vertical direction z. The at least one buffer member 140 has a horizontal distance Dx from the encapsulation glue fixing part 132 in the horizontal direction x. A ratio Dz/Dx of the vertical distance Dz to the horizontal distance Dx may fall within a better range, so that edges of the encapsulation glue 2 disposed on the at least one buffer member 140 are better adsorbed on the encapsulation glue fixing part 132 (e.g., a vacuum suction head). For example, in an embodiment, the ratio Dz/Dx of the vertical distance Dz to the horizontal distance Dx may fall in a range of 0.05 to 0.15. Specifically, in an embodiment, a height of the at least one buffer member 140 protruding from the upper mold 130 (i.e., the vertical distance Dz) may fall in a range of 0.5 mm to 1.5 mm, and the horizontal distance Dx of the at least one buffer member 140 and the encapsulation glue fixing part 132 may be substantially equal to 10 mm, but the disclosure is not limited thereto.

The following illustrates the process of the lamination method according to an embodiment of the disclosure with reference to FIG. 1A to FIG. 1C.

Referring to FIG. 1A, first, the panel 1 is retained in the lamination area 110a of the lower mold 110. For example, in an embodiment, the panel 1 may be retained in the lamination area 110a of the lower mold 110 by disposing the panel 1 in the groove 112 of the lower mold 110, but the disclosure is not limited thereto.

Referring to FIG. 1A, next, the encapsulation glue 2 is fixed to the upper mold 130 using the encapsulation glue fixing part 132 of the upper mold 130. For example, in an embodiment, the at least one buffer member 140 is disposed on the lower surface 130a of the upper mold 130, and the encapsulation glue fixing part 132 fixes the edges of the encapsulation glue 2 to the upper mold 130, and adheres a main body of the encapsulation glue 2 to the at least one buffer member 140.

Referring to FIG. 1A and FIG. 1B, next, the upper mold 130 is moved close to the lower mold 110 to laminate the encapsulation glue 2 and the panel 1, and the encapsulation glue is cut into a cutting part 2b and a laminating part 2a connected to the panel 1 using the cutting knife disposed in the lower mold 110 and located in the horizontal direction x between the lamination area 110a of the lower mold 110 and the encapsulation glue fixing part 132 of the upper mold 130.

Figure 2B:
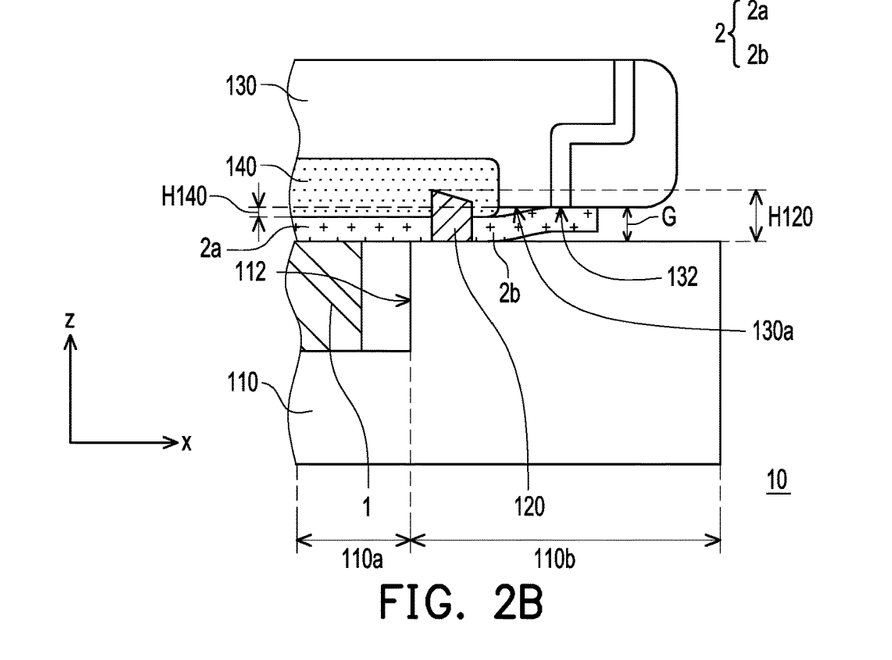
FIG. 2B is a partially enlarged schematic view of a lamination apparatus of FIG. 1B.

FIG. 2B is a partially enlarged schematic view of a lamination apparatus of FIG. 1B. Referring to FIG. 1B and FIG. 2B, in an embodiment, when the upper mold 130 and the lower mold 110 laminate the encapsulation glue 2 and the panel 1, a sum of a height H120 of the cutting knife 120 and a thickness H140 of at least a portion of the at least one buffer member 140 protruding from the lower surface 130a of the upper mold 130 is greater than or equal to a vertical distance G from the upper mold 130 to the peripheral area 113b of the lower mold 110. Thus, the cutting knife 120 may smoothly cut the encapsulation glue 2.

Referring to FIG. 1B and FIG. 1C, next, the upper mold 130 is moved away from the lower mold 110. The upper mold 130 fixes the cutting part 2b of the encapsulation glue 2 to the upper mold 130 through the encapsulation glue fixing part 132. The cutting part 2b of the encapsulation glue 2 is driven by the upper mold 130 away from the laminating part 2a connected to the panel 1. In this way, the lamination of the encapsulation glue 2 and the panel 1 is completed.

It should be noted that, as shown in FIG. 1B, when the encapsulation glue 2 and the panel 1 are laminated, the cutting knife 120 disposed in the peripheral area 110b of the lower mold 110 simultaneously cuts the encapsulation glue 2 into the cutting part 2b and the laminating part 2a. That is, cutting the encapsulation glue 2 and laminating the encapsulation glue 2 and the panel 1 may be accomplished in the same step. Thus, the process steps may be simplified and the time spent may be shortened. In addition, the chance of damaging the panel 1 during the process of cutting the encapsulation glue 2 may be reduced.

It should be noted here that the following embodiments continue to use the reference numerals and some content of the foregoing embodiment, wherein the same reference numerals are adopted to indicate the same or similar elements, and the description of the same technical content is omitted. The description of the omitted parts can be found in the foregoing embodiment and will not be repeated in the following embodiments.

Figure 3A:
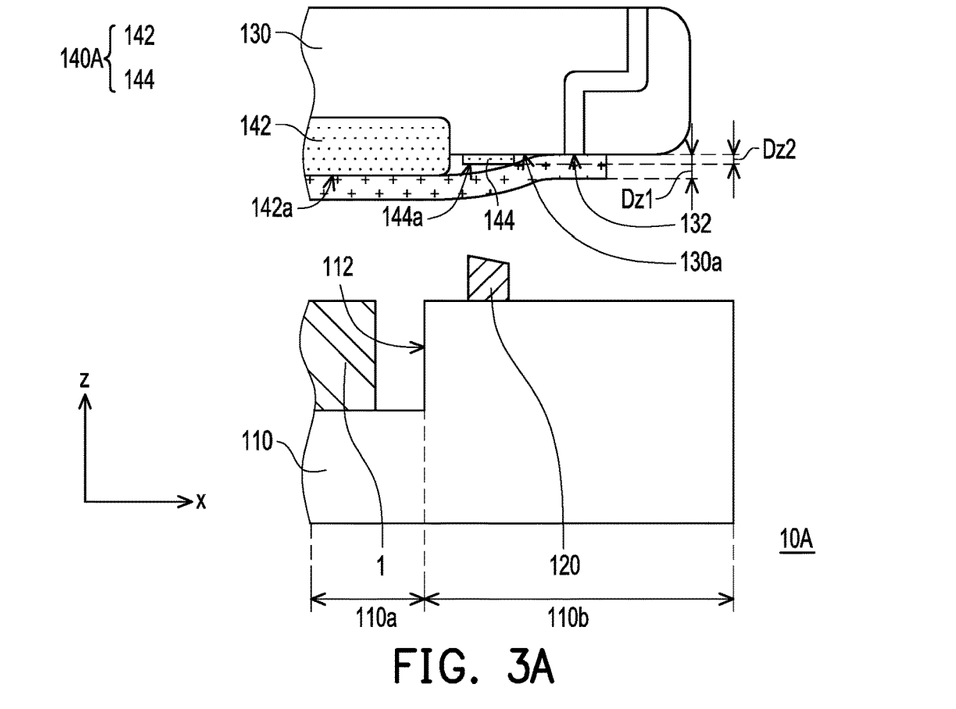
FIG. 3A to FIG. 3B are schematic cross-sectional views of a partial process of a lamination method according to another embodiment of the disclosure.
Figure 3B:
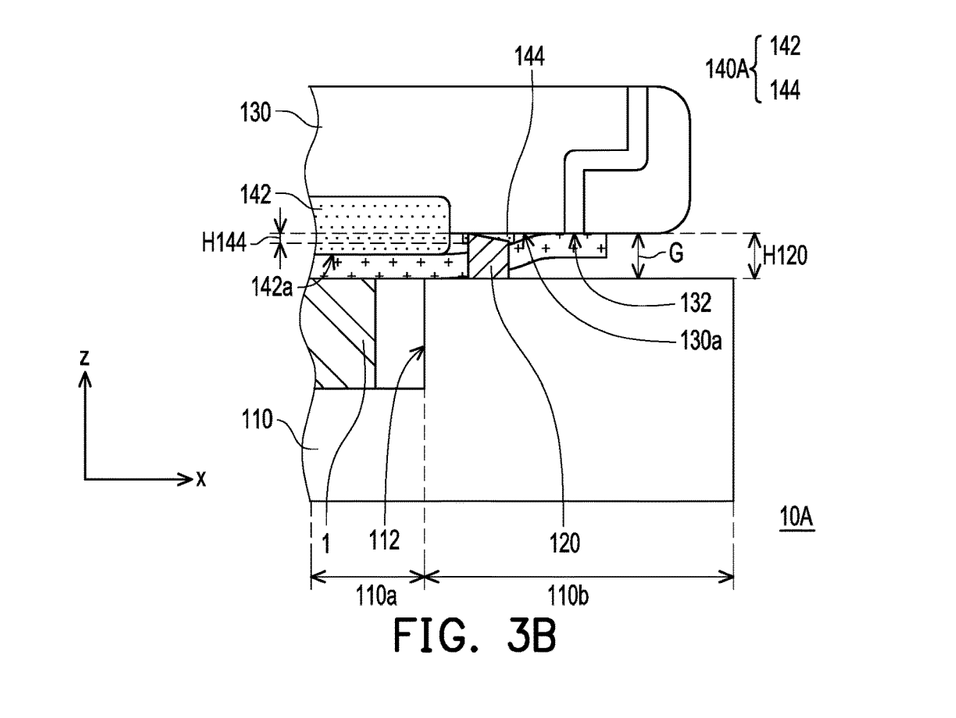

FIG. 3A to FIG. 3B are schematic cross-sectional views of a partial process of a lamination method according to another embodiment of the disclosure.

A partial process of the lamination method of a lamination apparatus 10A in FIG. 3A to FIG. 3B are similar to a partial process of the lamination method of the lamination apparatus 10A in FIG. 1A to FIG. 1B. The main difference between the embodiment of FIG. 3A to FIG. 3B and the embodiment of FIG. 1A to FIG. 1B is that at least one buffer member 140A of the lamination apparatus 10A of FIG. 3A to FIG. 3B is different from the at least one buffer member 140 of the lamination apparatus 10 of FIG. 1A to FIG. 1B. The partial process of the lamination method in FIG. 3A to FIG. 3B is similar to the partial process of the lamination method in FIG. 1A to FIG. 1B, and will not be repeated in the following.

Referring to FIG. 3A, in an embodiment, the at least one buffer member 140A may include a pressing buffer member 142 and a cutting buffer member 144. The pressing buffer member 142 and the cutting buffer member 144 are disposed on the upper mold 130 and separated from each other. The cutting buffer member 144 is located between the pressing buffer member 142 and the encapsulation glue fixing part 132 in the horizontal direction x. In an embodiment, the panel 1 disposed in the lamination area 110a of the lower mold 110 is located in an orthographic projection of the pressing buffer member 142 on the lower mold 110, and the cutting knife 120 is located in an orthographic projection of the cutting buffer member 144 on the lower mold 110.

Referring to FIG. 3A, in an embodiment, the upper mold 130 has a lower surface 130a facing the lower mold 110, and the pressing buffer member 142 has a lower surface 142a facing the lower mold 110. The cutting buffer member 144 has a lower surface 144a facing the lower mold 110. The pressing buffer member 142 and the cutting buffer member 144 protrude from the lower surface 130a of the upper mold 130, and a vertical distance Dz1 between the lower surface 142a of the pressing buffer member 142 and the lower surface 130a of the upper mold 130 is greater than or equal to a vertical distance Dz2 between the lower surface 144a of the cutting buffer member 144 and the lower surface 130a of the upper mold 130. For example, in an embodiment, the vertical distance Dz1 between the lower surface 142a of the pressing buffer member 142 and the lower surface 130a of the upper mold 130 may be greater than the vertical distance Dz2 between the lower surface 144a of the cutting buffer member 144 and the lower surface 130a of the upper mold 130, that is, the pressing buffer member 142 is more protruding from the upper mold 130 than the cutting buffer member 144, so that when the upper mold 130 and the lower mold 110 laminate the encapsulation glue 2 and the panel 1, the encapsulation 2 is first pressed on the panel 1.

Referring to FIG. 3B, in an embodiment, when the upper mold 130 and the lower mold 110 laminate the encapsulation glue 2 and the panel 1, a sum of the height H120 of the cutting knife 120 and a height H144 of the cutting buffer member 144 is greater than or equal to the vertical distance G from the upper mold 130 to the peripheral area 110b of the lower mold 110. Thus, the cutting knife 120 may smoothly cut the encapsulation glue 2.

Figure 4A:
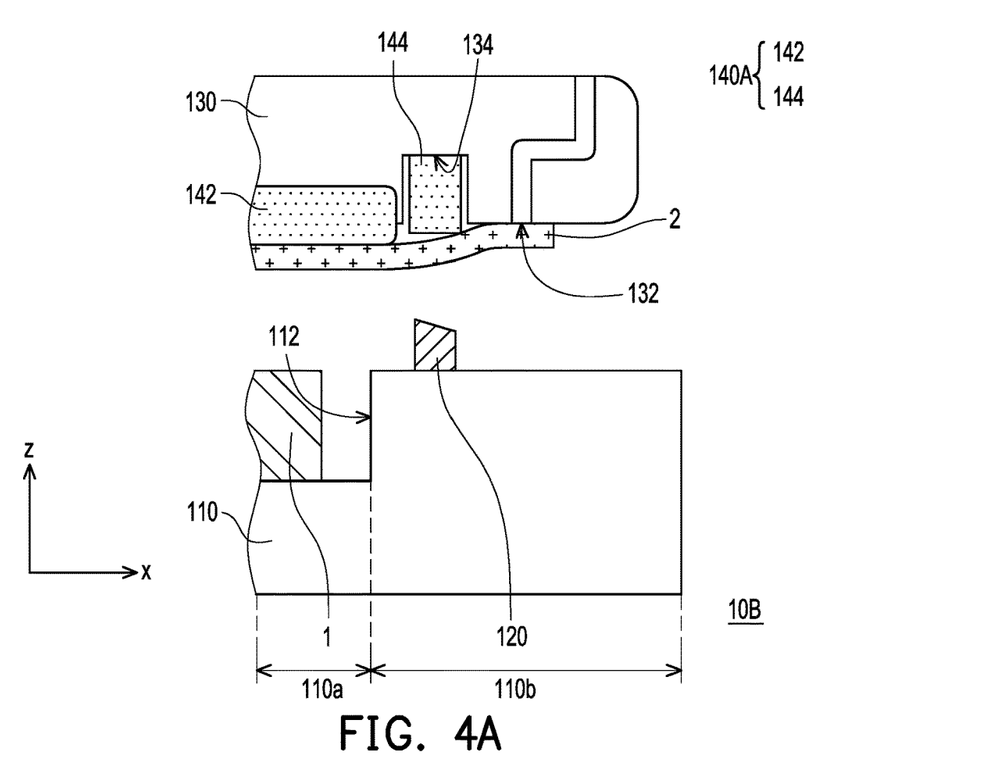
FIG. 4A to FIG. 4B are schematic cross-sectional views of a partial process of a lamination method according to yet another embodiment of the disclosure.
Figure 4B:
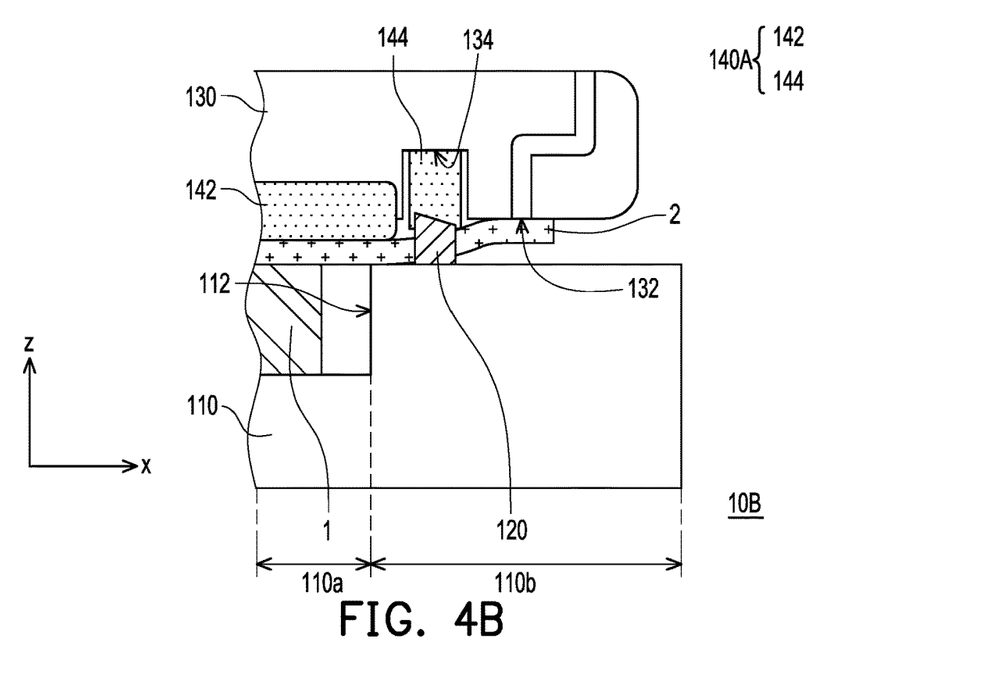

FIG. 4A to FIG. 4B are schematic cross-sectional views of a partial process of a lamination method according to yet another embodiment of the disclosure.

A partial process of the lamination method of a lamination apparatus 10B in FIG. 4A to FIG. 4B are similar to a partial process of the lamination method of the lamination apparatus 10A in FIG. 3A to FIG. 3B. The main difference between the embodiment of FIG. 4A to FIG. 4B and the embodiment of FIG. 3A to FIG. 3B is that the cutting buffer member 144 of FIG. 4A to FIG. 4B is disposed in a different location than the cutting buffer member 144 of FIG. 3A to FIG. 3B.

Specifically, in the embodiment of FIG. 4A and FIG. 4B, the upper mold 130 may have an accommodation groove 134, and the cutting buffer member 144 may be disposed in the accommodation groove 134. In an embodiment, the accommodation groove 134 is located between the pressing buffer member 142 and the encapsulation glue fixing part 132. The partial process of the lamination method in FIG. 4A to FIG. 4B is similar to the partial process of the lamination method in FIG. 1A to FIG. 1B, and will not be repeated in the following.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A lamination apparatus, adapted to laminate an encapsulation glue and a panel, comprising:
    a lower mold having a lamination area and a peripheral area adjacent to the lamination area,
    wherein the panel is adapted to be retained in the lamination area;
    an upper mold being movable close to or away from the lower mold and comprising an encapsulation glue fixing part, wherein the encapsulation glue fixing part is adapted to fix the encapsulation glue to the upper mold; and
    a cutting knife disposed in the peripheral area of the lower mold and located in a horizontal direction between the lamination area of the lower mold and the encapsulation glue fixing part of the upper mold.

2. The lamination apparatus according to claim 1, wherein the lamination area of the lower mold comprises a groove, and the panel is adapted to be retained in the groove.

3. The lamination apparatus according to claim 1 further comprising:
    at least one buffer member disposed on a lower surface of the upper mold facing the lower mold corresponding to the lamination area of the lower mold, wherein the panel disposed in the lamination area and the cutting knife are located in an orthographic projection of the at least one buffer member on the lower mold.

4. The lamination apparatus according to claim 1 further comprising:
    at least one buffer member disposed on a lower surface of the upper mold facing the lower mold corresponding to the lamination area of the lower mold, wherein the at least one buffer member protrudes from the lower surface of the upper mold and has a lower surface facing the lower mold, the lower surface of the at least one buffer member has a vertical distance from the lower surface of the upper mold in a vertical direction, the at least one buffer member has a horizontal distance from the encapsulation glue fixing part in the horizontal direction, and a ratio of the vertical distance to the horizontal distance falls in a range of 0.05 to 0.15.

5. The lamination apparatus according to claim 1 further comprising:
    at least one buffer member disposed on a lower surface of the upper mold facing the lower mold corresponding to the lamination area of the lower mold;
    wherein when the upper mold and the lower mold laminate the encapsulation glue and the panel, a sum of a height of the cutting knife and a thickness of at least a portion of the at least one buffer member protruding from the lower surface of the upper mold is greater than or equal to a vertical distance from the upper mold to the peripheral area of the lower mold.

6. The lamination apparatus according to claim 1 further comprising:
    a pressing buffer member and a cutting buffer member disposed in the upper mold, wherein the cutting buffer member is located between the pressing buffer member and the encapsulation glue fixing part in the horizontal direction.

7. The lamination apparatus according to claim 6, wherein the panel disposed in the lamination area of the lower mold is located in an orthographic projection of the pressing buffer member on the lower mold, and the cutting knife is located in an orthographic projection of the cutting buffer member on the lower mold.

8. The lamination apparatus according to claim 6, wherein the upper mold has a lower surface facing the lower mold, the pressing buffer member has a lower surface facing the lower mold, the cutting buffer member has a lower surface facing the lower mold, the pressing buffer member and the cutting buffer member protrude from the lower surface of the upper mold, and a vertical distance between the lower surface of the pressing buffer member and the lower surface of the upper mold is greater than or equal to a vertical distance between the lower surface of the cutting buffer member and the lower surface of the upper mold.

9. The lamination apparatus according to claim 6, wherein when the upper mold and the lower mold laminate the encapsulation glue and the panel, a sum of a height of the cutting knife and a height of the cutting buffer member is greater than or equal to a vertical distance from the upper mold to the peripheral area of the lower mold.

10. The lamination apparatus according to claim 6, wherein the upper mold has an accommodation groove, and the cutting buffer member is disposed in the accommodation groove.

11. A lamination method, adapted to laminate an encapsulation glue and a panel, comprising:
retaining the panel in a lamination area of a lower mold;
fixing the encapsulation glue to the upper mold using an encapsulation glue fixing part of an upper mold;
moving the upper mold close to the lower mold to laminate the encapsulation glue and the panel;
cutting the encapsulation glue into a cutting part and a laminating part connected to the panel using a cutting knife disposed in the lower mold and located in a horizontal direction between the lamination area of the lower mold and the encapsulation glue fixing part of the upper mold; and
moving the upper mold away from the lower mold, wherein the upper mold fixes the cutting part of the encapsulation glue to the upper mold through the encapsulation glue fixing part, and the cutting part of the encapsulation glue is driven by the upper mold away from the laminating part of the encapsulation glue.

12. The lamination method according to claim 11, wherein when the encapsulation glue and the panel are laminated, the cutting knife simultaneously cuts the encapsulation glue into the cutting part and the laminating part.

* * * * *